United States Patent
McClellan et al.

(10) Patent No.: US 7,111,035 B2
(45) Date of Patent: Sep. 19, 2006

(54) FAULT TOLERANCE ASSOCIATIONS FOR IP TRANSPORT PROTOCOLS

(75) Inventors: Stanley A. McClellan, Allen, TX (US); Robert L. Reeves, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 771 days.

(21) Appl. No.: 10/036,140

(22) Filed: Dec. 26, 2001

(65) Prior Publication Data

US 2003/0120716 A1    Jun. 26, 2003

(51) Int. Cl.
*G06F 15/16* (2006.01)
(52) U.S. Cl. .............. 709/201; 709/245; 709/228; 709/230; 709/231
(58) Field of Classification Search ......... 709/201, 709/200, 224–229, 232, 231; 370/352, 367; 714/6, 7, 11, 15
See application file for complete search history.

(56) References Cited

U.S. PATENT DOCUMENTS

2002/0107966 A1* 8/2002 Baudot et al. ............ 709/227
2003/0012183 A1* 1/2003 Butler et al. ............. 370/352
2004/0107234 A1* 6/2004 Rajahalme ............... 709/200

OTHER PUBLICATIONS

R. Stewart et al., *Stream Control Transmission Protocol (SCTP)*, Stream Control Transmission Protocol home page (1 p.).
*IPS7 EDGE, Stepping Over The Egde*, IPS7.net (6 p.).
R. Stewart et al., *Stream Control Transmission Protocol*, Network Working Group, Oct. 2000 (126 p.).

* cited by examiner

*Primary Examiner*—David Wiley
*Assistant Examiner*—Ji-Yong D. Chung

(57) ABSTRACT

The present disclosure addresses a system and method for failure tolerant communications using a transmission control protocol, preferably SCTP. In a preferred embodiment, an association is created between two instances of SCTP, where each instance is an endpoint. While an SCTP association provides for multiple IP addresses providing for multiple paths between the instances, it expressly does not provide for failover of the node occupied by the instance itself. The preferred embodiment provides a duplicate instance of SCTP on a separate node in the cluster which provides a hot back-up to the primary instance. The duplicate instance is maintained by replicating the state information for the association to keep the duplicate instance relatively synchronized with the primary instance.

23 Claims, 3 Drawing Sheets

FAULT TOLERANCE ASSOCIATIONS FOR IP TRANSPORT PROTOCOLS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to IP transport protocols which provide transport functions to internet and other applications. More specifically, the present invention involves implementation of transport layer functions which include multi-homing. The preferred embodiment relates to an extended implementation of Stream Control Transmission Protocol (hereinafter "SCTP").

2. Background of the Invention

SCTP is an IP transport protocol existing at an equivalent level to UDP (User Datagram Protocol) and TCP (Transmission Control Protocol). SCTP provides a reliable transport service which makes an effort to ensure that data is transported across a network without error and in sequence. SCTP is a connection oriented mechanism which insures that a relationship (or "association") is created between the endpoints of the session prior to the transmission of data and this relationship is maintained until all data transmission has been successfully completed.

One core feature of SCTP is "multi-homing" or the ability for a single SCTP endpoint to support multiple IP addresses. Among other features, multi-homing provides greater survivability of a session in the presence of network failures. In a single-homed session, the failure of a local LAN access can isolate the end system. With a "multi-homed" session, redundant LAN's can be used to reinforce local access. In a single-homed session, failures within the core network can cause temporary unavailability of transport until the IP routing protocols can reconverge around the point of failure. In a multi-homed session, various options are possible in the core network to reduce the dependency of failures for different addresses. For example, routing may be forced through different carriers by use of addresses with different prefixes. If there is control over the network architecture and protocols, route-pinning techniques or even redundant core networks can be used.

While the teachings of this disclosure may apply to any transmission control protocol and may be more easily applied to a transmission control protocol which supports multi-homing, they are preferably used with SCTP. Information regarding SCTP may be found at www.sctp.org and particularly the Request for Comments publication ("RFC") for the proposed SCTP standard (RFC 2960 dated October 2000) may be found at http://www.ietf.org/rfc/rfc2960.txt. These disclosures are incorporated herein by reference.

BRIEF SUMMARY OF THE INVENTION

The present disclosure provides various embodiments of a system for communicating between an outside computer and a cluster of computers. One embodiment of the system could contain the following elements. The cluster includes at least a first computer and a second computer. In its preferred embodiment, the system includes a primary instance of a transmission control protocol resident on the first computer and a secondary instance of a transmission control protocol resident on the second computer. A primary data structure is coupled to the primary instance where the primary data structure describes the state of an association defining pathways between the cluster and the outside computer. In the most preferred embodiment, a secondary data structure is coupled to the secondary instance, where the secondary data structure is replicated from the primary data structure. The primary instance comprises a first node in the association between the outside computer and the cluster and the outside computer comprises an opposite node. The secondary instance comprises a second node in the association between the outside computer and the cluster. The association is configured such that the first node and the second node appear to the opposite node as different addresses for the same node. An intra-cluster network couples the first computer and the second computer. A synchronization process coupled to the primary data structure and the secondary data structure replicates the primary data structure to the secondary data structure across the intra-cluster network to synchronize the structures.

The present disclosure also includes a method and software for implementing the method for building and using the discussed system.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, components may be referred to by different names. This document does not intend to distinguish between components that differ in name, but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical or communicative connection. Thus, if a first device couples to a second device, that connection may be through a direct connection, or through an indirect connection via other devices and connections.

DETAILED DESCRIPTION OF THE PREFERRED EMBODIMENTS

Figure 1:
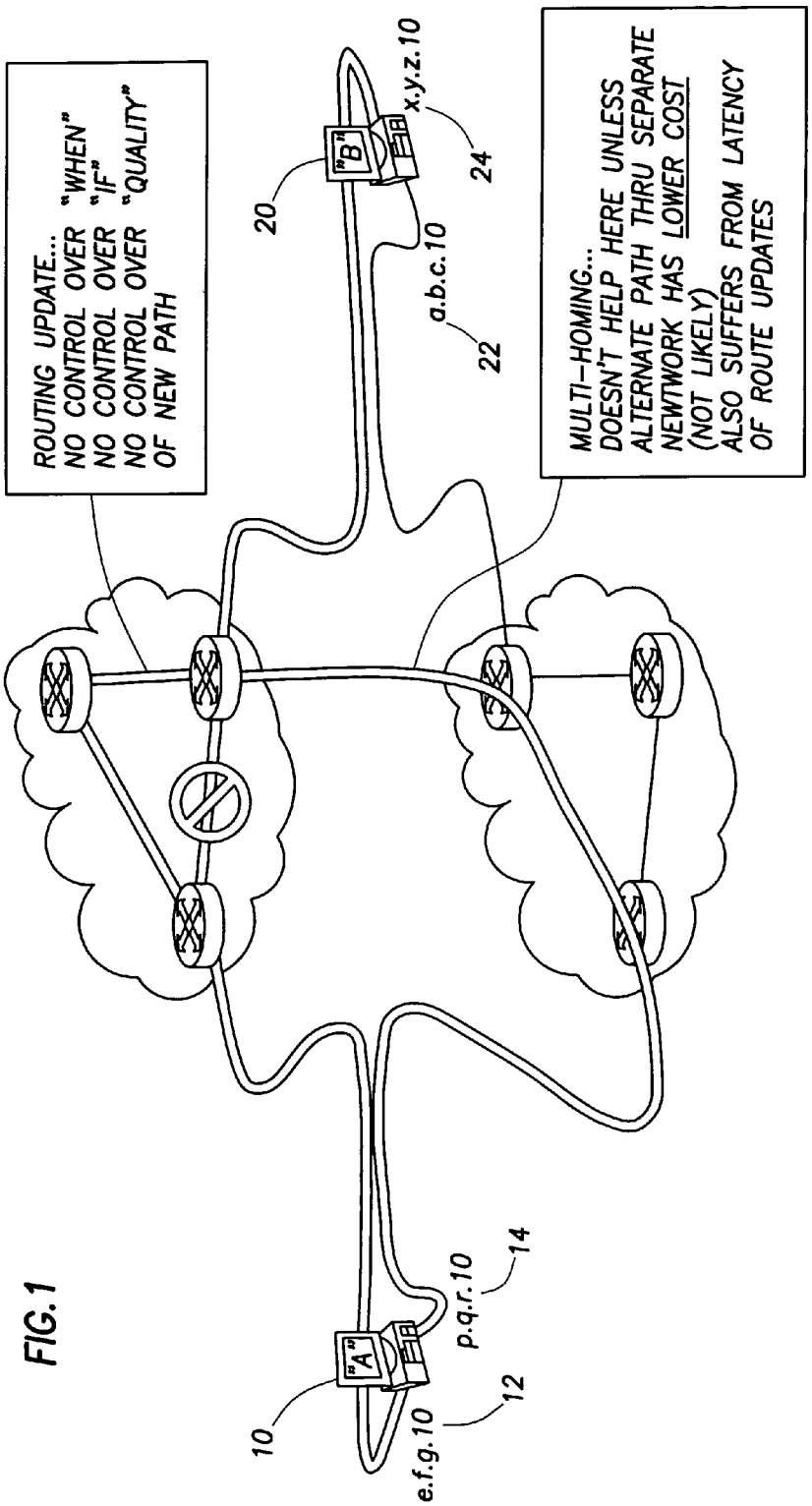
FIG. 1 shows a network diagram for a traditional internet session.

FIG. 1 illustrates exemplary potential routing for a normal communication session between two different computers through the internet. In this example, the first computer 10 has two IP addresses 12 and 14 providing two interfaces to reach computer 10. The outside computer 20 also has two IP addresses 22 and 24 providing two interfaces to reach computer 20. For the purposes of this disclosure, the term computer includes situations where a larger machine is independently running separate operating systems. In such a circumstance each independently running operating system could constitute an independent computer within the machine. In traditional TCP/IP communications, currently the most commonly used protocol for internet transport, the routing is highly flexible and variable, working to find its way between endpoints by whatever open paths are available. However, there is no real control over when routing will update to reflect problems with a particular path, no absolute control over if the update will occur, and no real control over the quality of the new path. Transport protocols such as TCP require an explicit IP address and port they are sending from and an explicit IP address and port they are sending to. These have to be established at the initiation of the exchange of information.

SCTP allows for multi-homing where the same endpoint may be defined using multiple IP addresses associated with distinct physical interfaces. The different interfaces provide different paths to arrive at the destination endpoint. If the primary path is failing, this may be detected and an alternate path chosen. SCTP gives two endpoints more control over when, where, and how their data gets transferred.

Figure 2:
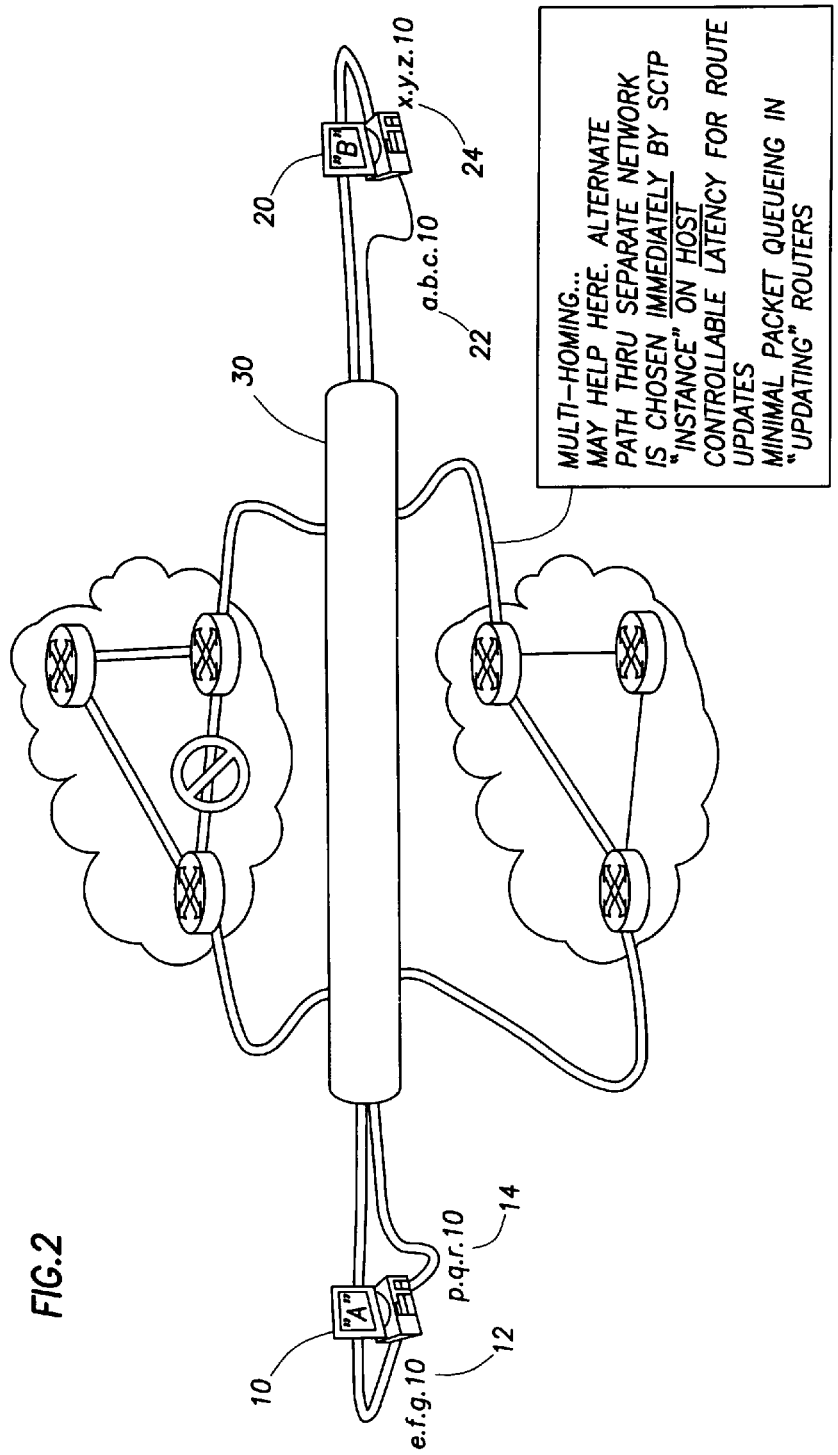
FIG. 2 shows a network diagram for an SCTP association.

FIG. 2 illustrates exemplary routing for two computers communicating using SCTP. The first computer 10 again has two IP addresses 12 and 14. The first computer 10 acts as a single node or endpoint for the communication. The separate IP addresses provide separate interfaces to reach the endpoint or node and may define separate pathways (for example access through a different LAN) for reaching the end point. In the illustrated embodiment, outside computer 20 also has two IP addresses 22 and 24. The two endpoints or nodes (computer 10 and computer 20) build an association 30 between them defining the state of the session and potential pathways for the session. In its current form, SCTP employs a single address as the primary address which is used as the destination for all data chunks for a normal transmission. However, retransmitted data chunks may use alternate addresses to improve the probability of reaching the remote endpoint. Continued failure of data sent to the primary address will ultimately result in transmission of all data to an alternate address until "heartbeats" can reestablish the reachability of the primary address.

The association 30 provides the "context" between the endpoints of the association. Under the proposed SCTP standards, there must be an association before any data is transferred. The association may be initiated explicitly, for example by call signaling, or implicitly, for example "piggybacked" on the initial data packet.

To support the multi-homing feature, SCTP endpoints exchange lists of addresses during initiation of the association. These may also be referred to as the "transport addresses" and reflect the list of IP addresses announced by each endpoint when the association is created. Each endpoint must be able to receive messages from any of the addresses associated with the remote endpoint. Under the proposed standard, multiple transport addresses are considered to be multiple IP interfaces on the same host or node. In practice, certain operating systems may use available source addresses in round robin fashion, in which case receipt of messages from different source addresses will be the normal case.

As defined in its standards proposal, SCTP preferably treats problems with failure of the path in the following manner. For example, a count is maintained on the number of retransmissions to a particular destination address without successful acknowledgement. When the count exceeds a configured maximum, the address is declared inactive, notification is given to the application, and the SCTP instance begins to use an alternate address for sending data chunks. Additionally heartbeat chunks (or heartbeats) are sent periodically to all idle addresses (i.e., alternate addresses defined in the association), and a counter is maintained on the number of heartbeats sent to an idle destination without receipt of a corresponding heartbeat acknowledgement. When this counter exceeds a configured maximum, that destination address is also declared inactive. Regardless of how or why an address is declared inactive, heartbeats continue to be sent to the inactive destination addresses until an acknowledgement is received, at which point the address can be made active again. The rate of sending heartbeats is tied to the retransmission timeout (RTO) estimation plus an additional delay, to allow heartbeat traffic to be tailored to the needs of the application.

By comparison, as defined in its standards proposal, SCTP preferably treats problems with failure of the endpoint in the following manner. A count is maintained across all destination addresses on the number of retransmits or heartbeats sent to the remote endpoint without a successful acknowledgement. When this exceeds a configured maximum, the endpoint is declared unreachable and the SCTP association is closed.

As a foundation issue as described in its proposed standard, SCTP is a unicast protocol which supports data exchange between exactly two endpoints, although these may be represented by multiple IP addresses. SCTP references implicitly assume that there is one monolithic host platform at each endpoint where association data structures and other information are maintained by a single operating system. If the operating system running the monolithic host, referred to more simply here as a monolitihic computer, "goes down" or encounters other types of disruption, important information regarding associations involving any of the network interfaces on that node will be lost. As a result, the integrity of signaling or other communication between the affected node and other endpoints will be compromised. In a clustered environment, such as any platform using embedded communication controllers, each separate "machine" must have its own SCTP instance. This instance embodies the data structures, timers, processes, and other "oversight" functions which provide SCTP with its IP-based redundancy and channel aware fault-recovery mechanisms. However, since SCTP implicitly assumes a monolithic host platform (operating system), boundaries are implicitly imposed on the shareability of the association data and other information internal to each SCTP instance.

As a result, the approaches of SCTP do not secure association data in the event of node failure. In other words, if an association between two SCTP endpoints is "live," the mechanisms built in to SCTP as defined by its proposed standard will be able to deal with path failure, interface failure, and various other types of unreachability problems. However, if the data, state, or other information regarding the association is lost through operating system or node failure, all communication between endpoints will be aborted. This scenario can arise when an operating system locks up, dies, or becomes too busy to service certain types of requests. Such a scenario is highly disfavored for signaling and other communications which require high-reliability channels.

So, in the embodiment of SCTP described in its proposed standard, there is assumed to be a monolithic host computer which may have separate interfaces defining separate paths to reach a second monolithic computer at the other endpoint.

In the preferred embodiment of the present disclosure, there may be instead multiple computers each with at least one interface and also the ability to cooperate and "borrow" the interface from other computers in the same cluster or network.

For one computer to borrow the interface of the other, the control software for the communication has to span two computers. This is simply not contemplated or addressed by the standard for the SCTP protocol. To protect against the event of one of the computers going down, while preserving the association, there needs to be copying of the data structures between the computers. The information copied is the information on the state of the association such as the physical condition of the interfaces, the logical condition of the connection, and the like.

The way SCTP is set up in its proposed standard, a single computer reviews the potential interfaces it owns and presumes they are attached to that computer. The computer has data structures, and timers, and algorithms, and state machines that maintain those interfaces, for example a primary data structure for the primary instance of SCTP. These help make up the instance of SCTP running on that computer. To get SCTP to span multiple computers in a group or cluster, one way to look at it is to view the group or cluster as a single "virtual computer" which must still maintain and copy as appropriate the key association data to provide access and redundancy for the instance of SCTP. In this manner the multiple separate computers of the cluster (acting as multiple separate nodes) may appear as a single "virtual endpoint" to the opposite or corresponding endpoint in the association. Similarly, the duplicate data structures storing the association state information assist to provide a "virtual socket" across multiple hosts. There is preferably provided a shared context for the SCTP association including having the sequence numbers available on node failure and the association state replicated for reliability.

An association is created between two instances of SCTP, where each instance is an endpoint. While an SCTP association provides for multiple IP addresses providing for multiple paths between the instances, it expressly does not provide for failover of the node occupied by the instance itself. The preferred embodiment of the present disclosure provides a duplicate instance of SCTP on a separate node in the cluster which provides a hot back-up to the primary instance. The duplicate instance is maintained by replicating the state information for the association to keep the duplicate instance relatively synchronized with the primary instance.

In the event of failure of the node on which the SCTP instance is located, the duplicate Instance on the other node in the cluster will take over in a manner which is transparent to the instance on the other end of the association. The other end will only perceive, either on its own through normal processes or alternatively through an express notification from the duplicate instance, that certain of the IP addresses to the receiving instance are no longer functioning (do not provide a heartbeat), but that one of the alternate addresses will communicate and now becomes the primary address (and hence the primary pathway). In this manner, the multi-homing feature designed for one purpose in the current SCTP protocol is used for a separate purpose by the preferred embodiment of the disclosed system. By allowing the association to be preserved even when the primary node is lost, a level of fault tolerance is provided to the instance itself as well as the fault tolerance designed in to SCTP for the connections making up the association.

Figure 3:
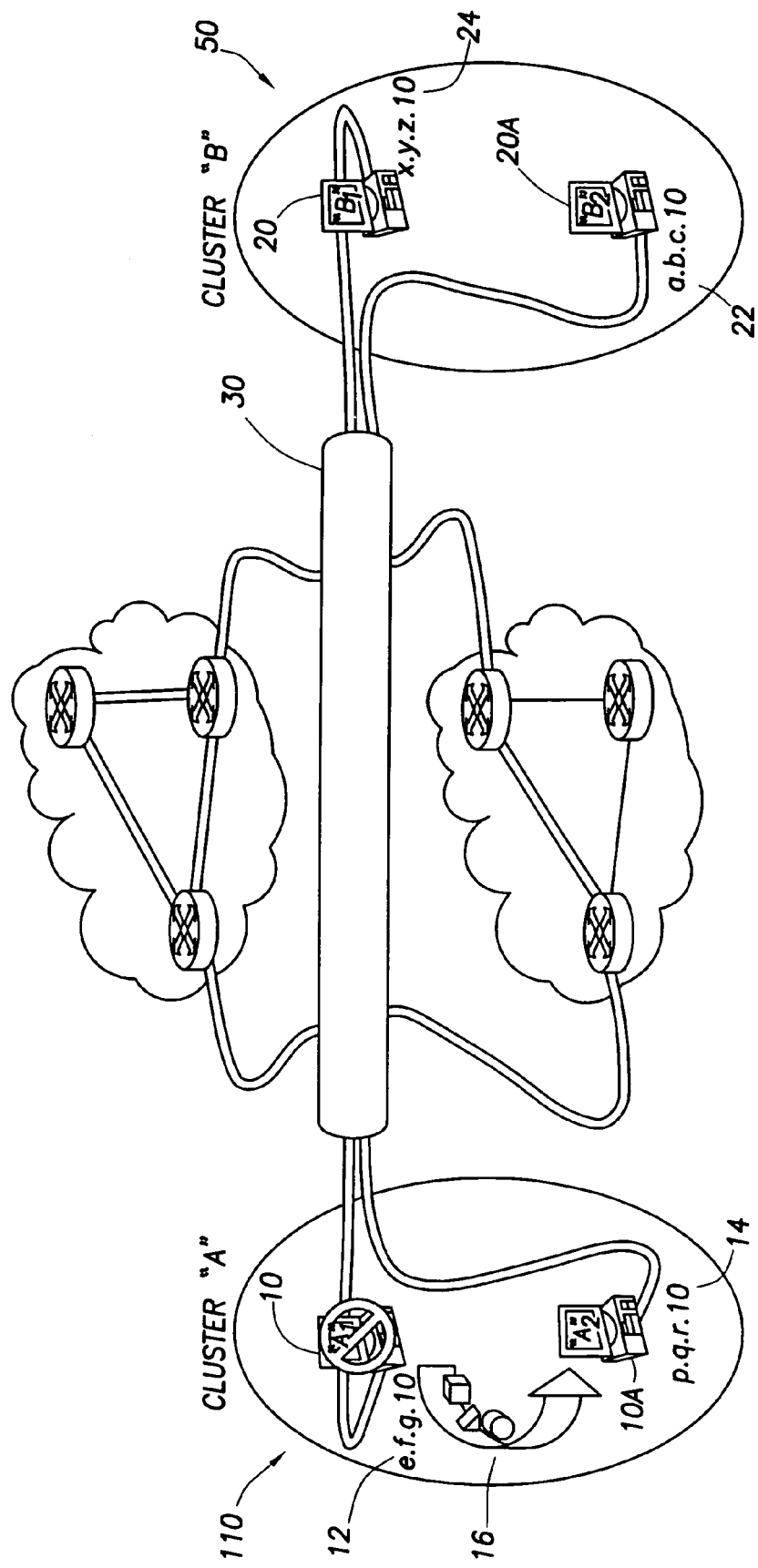
FIG. 3 shows a network diagram for an SCTP association incorporating a cluster of computers at each endpoint.

FIG. 3 illustrates a top-level view of one embodiment of the present disclosure. A first computer 10 and a second computer 10A are both a part of a first cluster 110. IP address 12 points to first computer 10 and provides an interface on that node. IP address 14 points to second computer 10A and provides an interface on that node.

It is typical for clustered machines to have a back-door for communication. In a monolithic host there is communication between different physical interfaces across its own bus or internal systems. In a clustered system such as first cluster 110, this link includes links (forming an intra-cluster network) between the separate computers, such as intra-cluster connection 16 between first computer 10 and second computer 10A. The intra-cluster connections are cooperatively working together in the cluster. These connections may also be referred to as an intra-cluster communication channel which in the preferred embodiment of the present disclosure provides dynamic update of the state of the association between the two computers. There will be separate instantiations (instances) of SCTP on each computer (10 and 10A) and the state diagram for the associations will be periodically synchronized between the computers in the cluster (by communicating over intra-cluster connection 16).

As with the proposed SCTP standard, the association 30 provides a communication path or multiple communication paths. In SCTP an association may include several possible interfaces. The control software will heartbeat to keep track of which interfaces are alive and well. If the primary interface goes down, the system automatically switches to one of the alternate interfaces. In the preferred embodiment of the present disclosure, some of the interfaces are on separate computers. In the illustrated embodiment, not only is the first cluster 110 providing a multiple node endpoint, but the second cluster 50 at the other end of association 30 also provides two nodes (computers 20 and 20A having IP addresses 22 and 24). For the purposes of the disclosure the other or opposite endpoint could equally well be a traditional single node on a computer 20 having one or multiple IP addresses (and hence one or multiple interfaces). If the first computer 10 with the primary interface goes down, the opposite endpoint, or more specifically the instance of SCTP on the other end of the association (cluster 50 as illustrated here), will note the failure and send to an alternate interface (the second computer 10A). Because the second computer has a copy of the state information for the association, it is able to step in and receive the information even if its own ability to reach the first computer is compromised. To the endpoint on the second or opposite cluster 50 here, it is transparent as to whether the alternate interface is on the same node or host or on a different node or host It knows only that the primary interface has failed and information should be sent to the alternate interface, which should have access to the state information to know what to do with the information being sent.

In any event, when the data flows to the endpoint under SCTP protocol, typically an application or process is watching the endpoint for the data. Once the instantiation on the computer has received the full data for the message it passes the data "over its shoulder" without concern for who the data is for. In the preferred embodiment, the applications or processes will know to watch all of the potential receiving nodes in the cluster for incoming data. In an alternative embodiment, the application or process will watch the primary node, and if the primary node fails, the application or process will start watching the next alternative node (from a mirror list to the one provided to the opposite endpoint during initiation of the association). Finally, the application or process could be watching the state information for the association to see which is the designated primary IP address and hence primary pathway.

The preferred embodiment of the present disclosure provides effectively a hot standby for the association (at least at one end). In the past, there was only one SCTP instance, albeit one which could have multiple interfaces. If the computer housing the instance went down, then a brand new instance with a brand new association would have to be created, basically going back and starting from scratch. So in the past, if the computer dies, then the instance dies, and the association dies. The process which was depending on the results (or the redundant back-up for the process) migrates to or takes over from another computer which has to reopen the association, reestablish encryption, and so on.

The preferred embodiment anticipates that there is a primary instance of SCTP on the first computer in the cluster and an alternate instance of SCTP on the second computer in the cluster standing ready to step in if there is a failure of the first computer which takes the first instance down. This arrangement would have the instance of SCTP on the second computer effectively acting as a dumb back-up for the primary instance. Another possible embodiment could have separate independent instances of SCTP on each computer, each of which is acting independently on its behalf while also serving as a back-up to the other in the event of failure. This could prove more challenging from a synchronization standpoint but could also provide additional functionality.

The most preferred embodiment also contemplates that the instance of SCTP residing on each computer will have its corresponding data structure (containing the state information for the association) also residing on the same computer. However, as long as the instance is coupled to its data structure, the data structure may be located on a different computer within the cluster or even a different computer outside of the cluster. The synchronization or replication of the primary data structure to the secondary or alternate data structure may occur at different intervals. The updates may occur as often as every packet or as infrequently as once after initiation of the association. In the most preferred embodiment, the secondary data structure is updated regularly (anywhere from every packet to about every five minutes to about every hour or to about every day or potentially greater) to keep it relatively current with the state of the association. Updates could also be event driven instead of scheduled, for example an update could be triggered by the initiation of a new stream of data. With some of the likely failure modes of the computer or primary instance, there may be some amount of warning and opportunity for action. This type of warning could also be used to trigger an update to the secondary data structure. Such triggers could include the detection of impending failure or likely impending failure of the computer on which the instance resides, the detection of impending failure or likely impending failure of the instance itself, or the detection of impending failure or likely impending failure of the primary communication path to the computer on which the instance resides. In any of these cases failure could include total failure, partial failure, or a potential delay of a length defined by the operator, among other possibilities recognized by those of skill in the art. In summary, synchronization or updating (by replication or by other means) could be triggered on a time schedule, or be triggered based on the occurrence of an event, where possible triggering events could include the updating of the primary data structure or the detection of possible failure of the instance of SCTP.

While in the preferred embodiment, there are two data structures, one corresponding to each instance of SCTP, an alternative embodiment would have a single data structure which is not located on the same computer as the primary instance of SCTP. As an example, the cluster may maintain a computer dedicated for storage or providing centralized services and the data structure containing the state of the association could be maintained there. The primary instance of SCTP would still be coupled to the data structure and would update the structure in the same manner it would update the data structure if it were residing on the same computer. However, in this alternate embodiment, the secondary instance of SCTP is also coupled to the same data structure. If the computer on which the primary instance is residing fails or if the primary instance fails and communication is sent to the secondary instance, the secondary instance will still be able to look to the primary data structure for the state of the association (since the primary data structure is resident independent of the primary instance and may survive or be reachable independently of the primary instance).

Another alternative embodiment is somewhat of a hybrid of the preceding two embodiments as far as synchronization/updating. In this alternative, the first computer has a complete SCTP instance (including the functional parts as well as the data parts found in the data structure), while the second computer has an incomplete SCTP instance, i.e. just the functional parts either without having the data parts or having only the base data structure or a very rarely updated data structure. During normal operation, any packets sent to the second instance in its role as an alternate IP address when there are reachability problems would simply be forwarded to the first instance without maintaining a complete local copy of the information on the state of the association because the master copy would be on the primary computer. Then, when the primary computer detects an impending system failure or outage (a possible trigger for update discussed above, it transfers the master copy (updates or synchronizes the secondary data structure and potentially also passes control explicitly to the instance) to the secondary computer. This alternate embodiment is sort of a hybrid version because there is only one data structure being regularly maintained, but instead of being located remotely from the first computer it is located on the first computer and its update mechanism to the secondary data structure is more of a one-shot update triggered by suspected failure (at least in its final phase).

In any event while there are advantages and disadvantages of the various methods of triggering or scheduling the updates or locations and number of the data structures storing the information on the state of the association, the effective ability of the present disclosure to provide opportunity for a second instance of SCTP to pick up for a failed first instance of SCTP without need to rebuild the association from scratch still provides significant advantages.

The present disclosure may also be viewed as a method of communicating between an outside computer and a first computer using a transmission control protocol. From this perspective, there would be a preferred set of actions to take to implement the method. One would instantiate a primary instance of the transmission control protocol (preferably SCTP) on the first computer. One would instantiate a corresponding instance of the transmission control protocol on the outside computer. And, one would instantiate a secondary instance of the transmission control protocol on a second computer coupled to the first computer. One would build an association defining pathways of communication between the primary instance and the corresponding instance wherein the secondary instance is defined as an alternate address for the primary instance. One would then store state information regarding the association in a primary data structure coupled to the primary instance. It would be preferable to replicate the primary data structure to a secondary data structure coupled to the secondary instance. Once set up one could commence communicating between the primary instance and the corresponding instance through the pathways defined by the association using the transmission control protocol. As one was communicating, one would update state information regarding the association in the primary data structure. At various possible times as discussed above, one would synchronize the secondary data structure to reflect updates to the primary data structure. It would be preferable, but not required that the first computer and the second computer are part of a cluster having an intra-cluster network and that the actions of replicating and synchronizing occur across the intra-cluster network. In an alternative method, the secondary instance could be coupled to the primary data structure (which for this embodiment would preferably not be located on the same computer as the primary instance) and on failure of the first computer on which the primary instance resides, communication would shift to occur between the secondary instance and the corresponding instance through the pathways defined by the association as stored in the primary data structure.

One of skill in the art will recognize that code (software) may be written to implement the software apparatus or method of the present invention. Specifically code could be written which accomplishes each of the method actions described above and below. The code or software can be stored on a suitable storage medium such as a hard disk drive, CD ROM or floppy disk and executed during system operation.

The above discussion is meant to be illustrative of the principles and various embodiments of the present invention. While the invention has been particularly shown and described with respect to specific embodiments thereof, numerous variations and modifications will become apparent to those skilled in the art once the above disclosure is fully appreciated. It is intended that the following claims be interpreted to embrace all such variations and modifications.

What is claimed is:

1. A system for communicating between an outside computer and a cluster of computers comprising:
   a first computer and a second computer, comprising: a primary instance of a transmission control protocol resident on the first computer;
   a primary data structure coupled to the primary instance describing the state of an association defining pathways between the cluster and the outside computer, the state description including names or addresses of the first computer, the second computer, and the outside computer;
   a secondary instance of a transmission control protocol resident on the second computer;
   a secondary data structure coupled to the secondary instance replicated from the primary data structure;
   an intra-cluster network coupling the first computer and the second computer;
   a synchronization process coupled to the primary data structure and the secondary data structure replicating the primary data structure to the secondary data structure across the intra-cluster network to synchronize the structures;
   wherein the primary instance comprises a first node in the association between the outside computer and the cluster and wherein the outside computer comprises an opposite node;
   wherein the secondary instance comprises a second node in the association between the outside computer and the cluster;
   wherein the association is configured such that address of the first node and the address of the second node are provided to the opposite node at the same time as different addresses for the same node through the communication between the cluster and the opposite node in accordance with the transmission control protocol.

2. The system of claim 1, wherein the primary data structure is resident on the first computer and the secondary data structure is resident on the second computer.

3. The system of claim 1, wherein the outside computer comprises a cluster of computers.

4. The system of claim 1, wherein:
   the transmission control protocol comprises SCTP;
   the primary instance is a primary instance of SCTP;
   the secondary instance is a secondary instance of SCTP.

5. The system of claim 1, wherein the synchronization process is triggered by detection of impending failure of the first instance.

6. The system of claim 5, wherein the synchronization process occurs once after detection of impending failure of the first instance.

7. A system for communicating between an outside computer and a cluster of computers comprising a first computer, a second computer, and a third computer comprising:
   a primary instance of a transmission control protocol resident on the first computer;
   a primary data structure resident on the second computer coupled to the primary instance describing the state of an association defining pathways between the cluster and the outside computer, the state description including names or addresses of the first computer and the third computer in the cluster and of the outside computer;
   a secondary instance of a transmission control protocol resident on the third computer coupled to the primary data structure;
   an intra-cluster network coupling the first computer, the second computer, and the third computer;
   wherein the primary instance comprises a first node in the association between the outside computer and the cluster and wherein the outside computer comprises an opposite node;
   wherein the secondary instance comprises a second node in the association between the outside computer and the cluster;
   wherein the association is configured such that the address of the first node and the address of the second node are provided to the opposite node at the same time as different addresses for the same node through the communication between the cluster and the opposite node in accordance with the transmission control protocol.

8. The system of claim 7, wherein the outside computer comprises a cluster of computers.

9. The system of claim 7, wherein:
   the transmission control protocol comprises SCTP;
   the primary instance is a primary instance of SCTP;
   the secondary instance is a secondary instance of SCTP.

10. A method of communicating between an outside computer and a first computer using a transmission control protocol comprising:
  instantiating a primary instance of the transmission control protocol on the first computer;
  instantiating a corresponding instance of the transmission control protocol on the outside computer;
  instantiating a secondary instance of the transmission control protocol on a second computer coupled to the first computer;
  building an association defining pathways of communication between the primary instance and the corresponding instance wherein the address of the secondary instance and the address of the primary instance are provided to the corresponding instance at the same time and the address of the secondary instance is defined as an alternate address for the primary instance through the communication between the first computer, the second computer, and the outside computer in accordance with the transmission control protocol;
  storing state information regarding the association in a primary data structure coupled to the primary instance, the state description including names or addresses of the first computer, the second computer and the outside computer;
  replicating the primary data structure to a secondary data structure coupled to the secondary instance;
  communicating between the primary instance and the corresponding instance through the pathways defined by the association using the transmission control protocol;
  updating state information regarding the association in the primary data structure; and
  synchronizing the secondary data structure to reflect updates to the primary data structure.

11. The method of claim 10, wherein:
  the first computer and the second computer are part of a cluster having an intra-cluster network; and
  replicating and synchronizing occur across the intra-cluster network.

12. The method of claim 10, wherein the corresponding instance of the transmission control protocol on the outside computer does not recognize that the primary instance and the secondary instance are not the same instance, but does recognize that it is transmitting to an alternate address.

13. The method of claim 10, wherein an action of synchronizing occurs after every action of updating.

14. The method of claim 10, wherein an action of synchronizing is triggered on a time schedule.

15. The method of claim 10, wherein an action of synchronizing is triggered based on the occurrence of an event.

16. The method of claim 15, wherein an action of synchronizing is triggered based on the detection of possible failure of the first instance.

17. The method of claim 10, wherein:
  the transmission control protocol comprises SCTP;
  the primary instance is an instance of SCTP;
  the corresponding instance is an instance of SCTP; and
  the secondary instance is an instance of SCTP.

18. A method of communicating between an outside computer and a first computer using a transmission control protocol comprising:
  instantiating a primary instance of the transmission control protocol on the first computer;
  instantiating a corresponding instance of the transmission control protocol on the outside computer;
  instantiating a secondary instance of the transmission control protocol on a second computer coupled to the first computer;
  building an association defining pathways of communication between the primary instance and the corresponding instance wherein the address of the secondary instance and the address of the primary instance are provided to the corresponding instance at the same time and the address of the secondary instance is defined as an alternate address for the primary instance through the communication between the first computer, the second computer, and the outside computer in accordance with the transmission control protocol;
  storing state information regarding the association in a primary data structure coupled to the primary instance but located on a separate computer from the primary instance and coupled to the secondary instance, the state description including names or addresses of the first computer, the second computer and the outside computer;
  communicating between the primary instance and the corresponding instance through the pathways defined by the association using the transmission control protocol;
  updating state information regarding the association in the primary data structure; and
  on failure of the first computer on which the primary instance resides, communicating between the secondary instance and the corresponding instance through the pathways defined by the association as stored in the primary data structure.

19. The method of claim 18, wherein: the first computer and the second computer are part of a cluster having an intra-cluster network.

20. The method of claim 18, wherein:
  the transmission control protocol comprises SCTP;
  the primary instance is an instance of SCTP;
  the corresponding instance is an instance of SCTP; and
  the secondary instance is an instance of SCTP.

21. The method of claim 18, wherein the corresponding instance of the transmission control protocol on the outside computer does not recognize that the primary instance and the secondary instance are not the same instance, but does recognize that it is transmitting to an alternate address.

22. A method of communicating between an outside computer and a first computer using a transmission control protocol comprising:
  instantiating a primary instance of the transmission control protocol on the first computer;
  instantiating a corresponding instance of the transmission control protocol on the outside computer;
  instantiating a secondary instance of the transmission control protocol on a second computer coupled to the first computer;
  building an association defining pathways of communication between the primary instance and the corresponding instance wherein the address of the secondary instance and the address of the primary instance are provided to the corresponding instance at the same time and the address of the secondary instance is defined as an alternate address for the primary instance through the communication between the first computer, the second computer, and the outside computer in accordance with the transmission control protocol;
  storing state information regarding the association in a primary data structure coupled to the primary instance, the state description including names or addresses of the first computer, the second computer and the outside computer;

communicating between the primary instance and the corresponding instance through the pathways defined by the association using the transmission control protocol;

updating state information regarding the association in the primary data structure; and upon detection of a triggering event, replicating the primary data structure to a secondary data structure coupled to the secondary instance.

23. The method of claim 22 wherein the triggering event is the detection of impending failure of the primary instance.

* * * * *